United States Patent
Talwar et al.

(10) Patent No.: US 9,031,612 B2
(45) Date of Patent: May 12, 2015

(54) SPATIAL ALIGNMENT FOR D2D INTERFERENCE MITIGATION

(71) Applicant: Intel Corporation, Santa Clara, CA (US)

(72) Inventors: Shilpa Talwar, Los Altos, CA (US);
Namyoon Lee, Austin, TX (US);
Kerstin Johnsson, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 13/798,652

(22) Filed: Mar. 13, 2013

(65) Prior Publication Data

US 2014/0274088 A1 Sep. 18, 2014

(51) Int. Cl.
*H04W 68/00* (2009.01)
*H04J 11/00* (2006.01)

(52) U.S. Cl.
CPC .................... *H04J 11/0023* (2013.01)

(58) Field of Classification Search
CPC ..... H04W 88/08; H04W 28/04; H04W 16/24; H04W 16/28; H04W 16/32
USPC .......... 455/561, 562.1, 67.11, 67.13, 455/226.1–226.3
See application file for complete search history.

(56) References Cited

U.S. PATENT DOCUMENTS

| | | |
|---|---|---|
| 2008/0310329 A1 | 12/2008 | Sun et al. |
| 2010/0261469 A1 | 10/2010 | Ribeiro et al. |
| 2011/0274187 A1* | 11/2011 | Huang et al. .................. 375/260 |
| 2011/0275382 A1 | 11/2011 | Hakola et al. |
| 2012/0099540 A1 | 4/2012 | Doppler et al. |
| 2012/0329465 A1* | 12/2012 | Warner et al. ................. 455/446 |
| 2013/0039256 A1 | 2/2013 | Shin et al. |
| 2014/0064203 A1* | 3/2014 | Seo et al. ....................... 370/329 |
| 2014/0086152 A1* | 3/2014 | Bontu et al. ................... 370/329 |
| 2014/0226504 A1* | 8/2014 | Tavildar et al. ............... 370/252 |
| 2014/0233457 A1* | 8/2014 | Koutsimanis et al. ........ 370/328 |
| 2014/0233494 A1* | 8/2014 | Sorrentino .................... 370/329 |

FOREIGN PATENT DOCUMENTS

| | | |
|---|---|---|
| WO | WO-2010097645 A1 | 9/2010 |
| WO | WO-2012034269 A1 | 3/2012 |

OTHER PUBLICATIONS

"International Application Serial No. PCT/US2014/024146, International Search Report mailed Jul. 10, 2014", 4 pgs.
"International Application Serial No. PCT/US2014/024146, Written Opinion mailed Jul. 10, 2014", 9 pgs.

* cited by examiner

*Primary Examiner* — Temica M Beamer
(74) *Attorney, Agent, or Firm* — Schwegman Lundberg & Woessner, P.A.; J. Kevin Parker

(57) ABSTRACT

Described are techniques for managing the interference produced by D2D (device-to-device) transmissions that may be used in conjunction with transmit power control but operate independently. In one technique, interference between D2D transmissions and cellular uplink transmissions using common resources as received at a base station is managed by opportunistic interference alignment and clustering of D2D devices. In another technique, interference between different D2D devices using the same resources is mitigated by base-station aided space-time interference alignment.

24 Claims, 7 Drawing Sheets

US 9,031,612 B2

SPATIAL ALIGNMENT FOR D2D INTERFERENCE MITIGATION

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communication between two or more D2D devices is typically very local, due to the short distance between D2D devices and uses very lower transmit power. D2D communications is also a powerful way to increase spatial reuse in cellular systems for higher throughput.

One approach to D2D communications as an underlay to an LTE network infrastructure is an out-of-band solution, in which the D2D traffic is unloaded to an unlicensed band (e.g., Wi-Fi as defined by the IEEE 802.11 standards) on the application layer. Another approach is an in-band solution, in which the D2D transmissions take place in the same licensed band used by the LTE network. In the latter approach, managing the interference caused by D2D transmissions becomes a significant problem.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

D2D communications as an underlay to an LTE or other cellular network may be implemented in the licensed band with separate orthogonal resources allocated to each D2D session. In that case, the D2D devices produce no interference. When the available resources are such that non-orthogonal resources are shared between D2D communications and the cellular network, however, D2D transmissions may interfere with other D2D sessions and with communications between cellular UEs and the eNB, the latter being confined to UE transmissions to the eNB if only uplink resources are allocated for D2D communications. One way to deal with this problem is to control the transmit power of D2D devices. Reducing D2D interference via power control, however, becomes increasingly difficult as the distance between the communicating D2D devices increases. Described herein are techniques for managing the interference produced by D2D transmissions that may be used in conjunction with transmit power control but operate independently.

System Description

Figure 1:
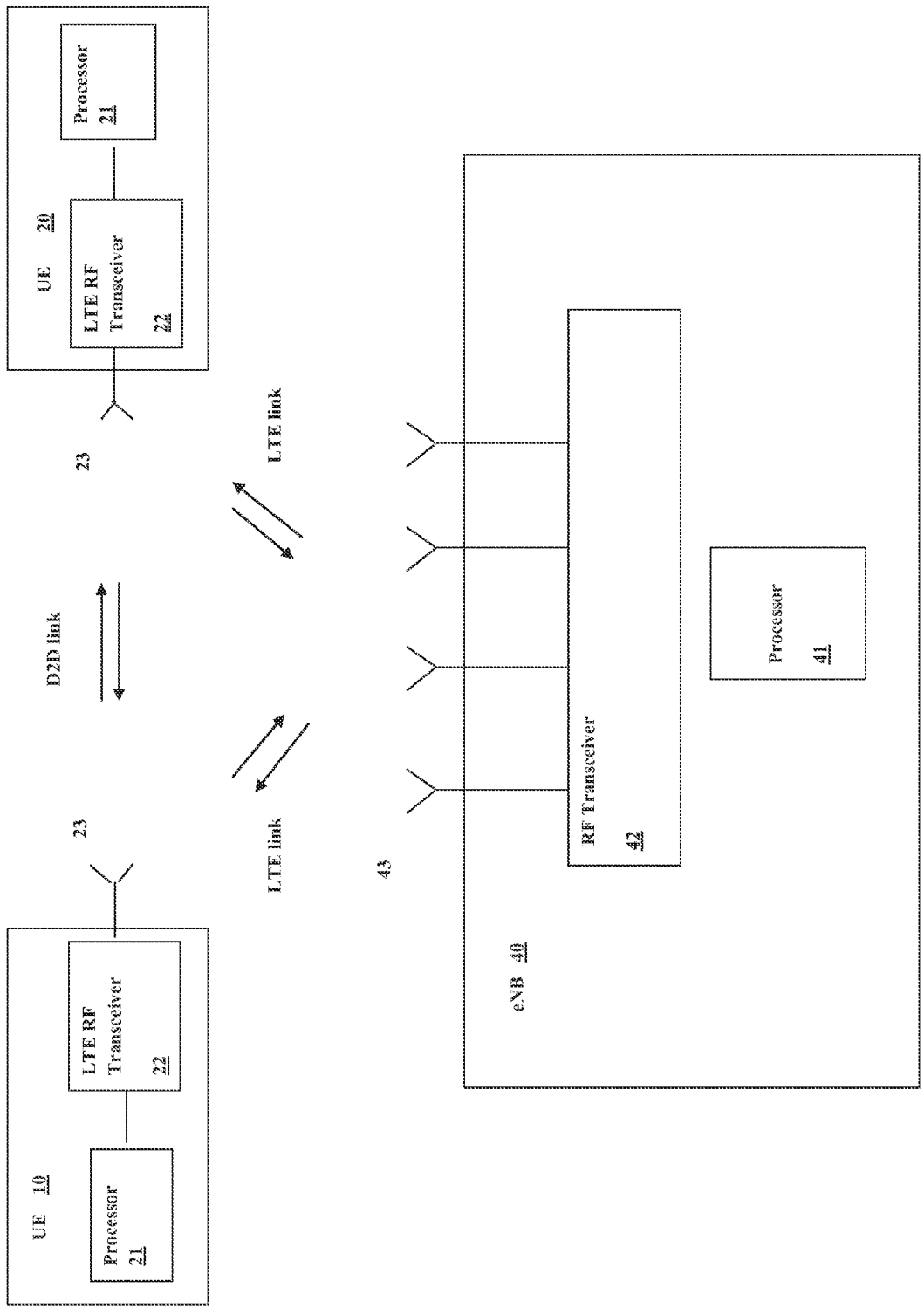
FIG. 1 shows example of UE devices for D2D communications and an eNB.

FIG. 1 shows an example of a UE 10 and a UE 20, each of which incorporates a processor 21 interfaced to a radio-frequency (RF) transceiving circuitry 22 that is connected to one or more antennas 23. A base station or eNB 40 is shown with a processor 41 interfaced to an RF transceiving circuitry 42 that is connected to a plurality of antennas 43. The illustrated components are intended to represent any type of hardware/software configuration for providing air interfaces for both LTE and D2D communication and for performing the processing functions as described herein. In the embodiment shown in the figure, UEs 10 and 20 both communicate with the eNB 40 via LTE links and with one another via a D2D link.

The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest time-frequency resource in LTE. LTE transmissions in the time domain are organized into radio frames, each having a duration of 10 ms. Each radio frame consists of 10 sub-frames, and each sub-frame consists of two consecutive 0.5 ms slots. Each slot comprises six indexed OFDM symbols for an extended cyclic prefix and seven indexed OFDM symbols for a normal cyclic prefix. A group of resource elements corresponding to twelve consecutive subcarriers within a single slot is referred to as a resource block (RB) or, with reference to the physical layer, a physical resource block (PRB). In TDD (time division duplex) operation as opposed to FDD (frequency division duplex) operation, subframes are allocated for either uplink or downlink transmission with a special subframe occurring at the transition from downlink to uplink transmission (but not at the transition from uplink to downlink transmission).

Figure 2:
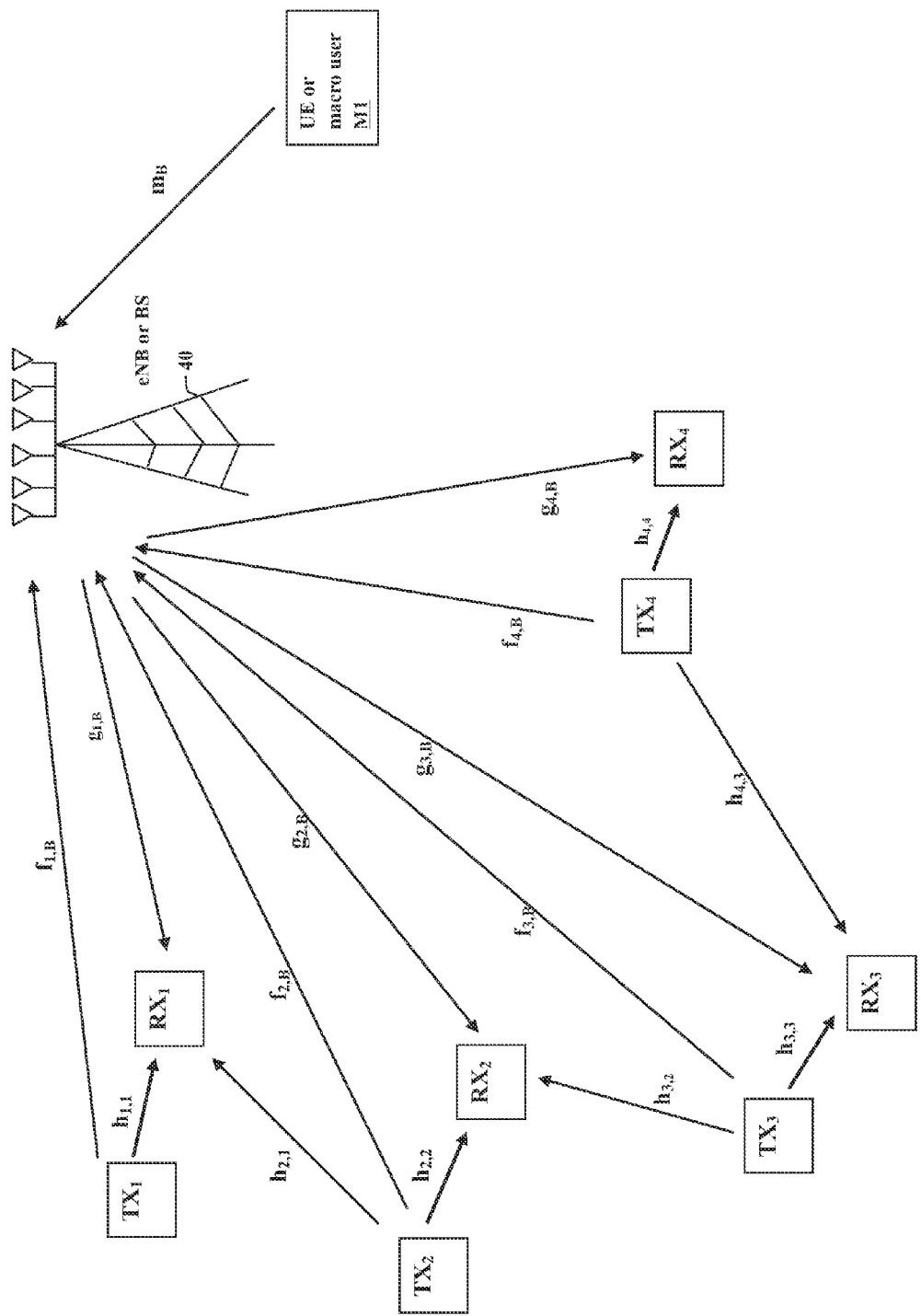
FIG. 2 illustrates an example configuration of D2D links.

FIG. 2 shows an arrangement of four pairs of UEs, each pair being made up of a transmitter $TX_i$ that transmits via a D2D link to a receiver $RX_i$, for i=1 to 4. The channel transfer function for each D2D link is designated as $h_{i,i}$ for i=1 to 4. The UEs also communicate with a base station or eNB 40 with a link gain from transmitter $TX_i$ to the base station of $f_{i,B}$ and from the base station to receiver $RX_i$ of $g_{i,B}$, for i=1 to 4. A macro user or cellular UE M1 is also shown as communicating with the base station over a macro link with a channel transfer function of $m_B$. If the D2D links and the macro link utilize time-frequency resources in common, the macro user's uplink with the base station may be interfered with by the D2D transmissions, and each transmitter's D2D link with its paired receiver may be interfered with by the transmissions of other D2D transmitters. Techniques for managing both of these types of interference will be described below.

Opportunistic Interference Alignment and Clustering

In one approach, the inter-tier interference problem between cellular users and D2D users may be managed by opportunistic interference alignment and clustering of D2D users. In one embodiment, the base station (BS), which may be an eNB, selectively allows transmission by only those D2D transmitters whose interference power at the BS can be mitigated by spatial decoding of cellular UE transmissions. As a result, the BS may allow simultaneous D2D transmissions from the selected D2D transmitters and still be able to serve macro uplink (i.e., cellular) users reliably. Controlling the admission of D2D transmitters into D2D sessions in this manner may be implemented by either centralized admission control or distributed D2D admission control.

In one embodiment, using centralized admission control, the BS with multiple antennas first chooses a decoder (spatial direction) for the macro user signal detection, then selects a group of D2D transmitters that have channel directions between the D2D transmitter and the BS that are nearly orthogonal to the decoder direction used for macro user detection. The selected group may be referred to as a cluster, and the BS provides the D2D cluster information to the devices in a control message. The selected cluster of D2D transmitters may then send data simultaneously with the uplink macro user with reduced interference to the BS receiver. In another embodiment, using distributed D2D admission control, the BS decides the spatial decoder direction and quantizes it using a predefined codebook that is shared with the D2D transmitters. Thereafter, the BS broadcasts the codebook index using a control channel. Using this codebook index information, each D2D transmitter decides whether the D2D transmission proceeds or not by computing the possible interference power caused to the BS. Again, this enables multiple concurrent D2D transmissions in the cellular network (uplink), while protecting the macro users from the interference caused by D2D transmitters. Because multiple concurrent D2D transmissions take place, these techniques improve the spatial reuse factor of the network, which leads to significant network throughput gain. These techniques may even yield higher reuse capacity as the number of D2D links increases because they exploit the multiuser diversity effect.

Figure 3:
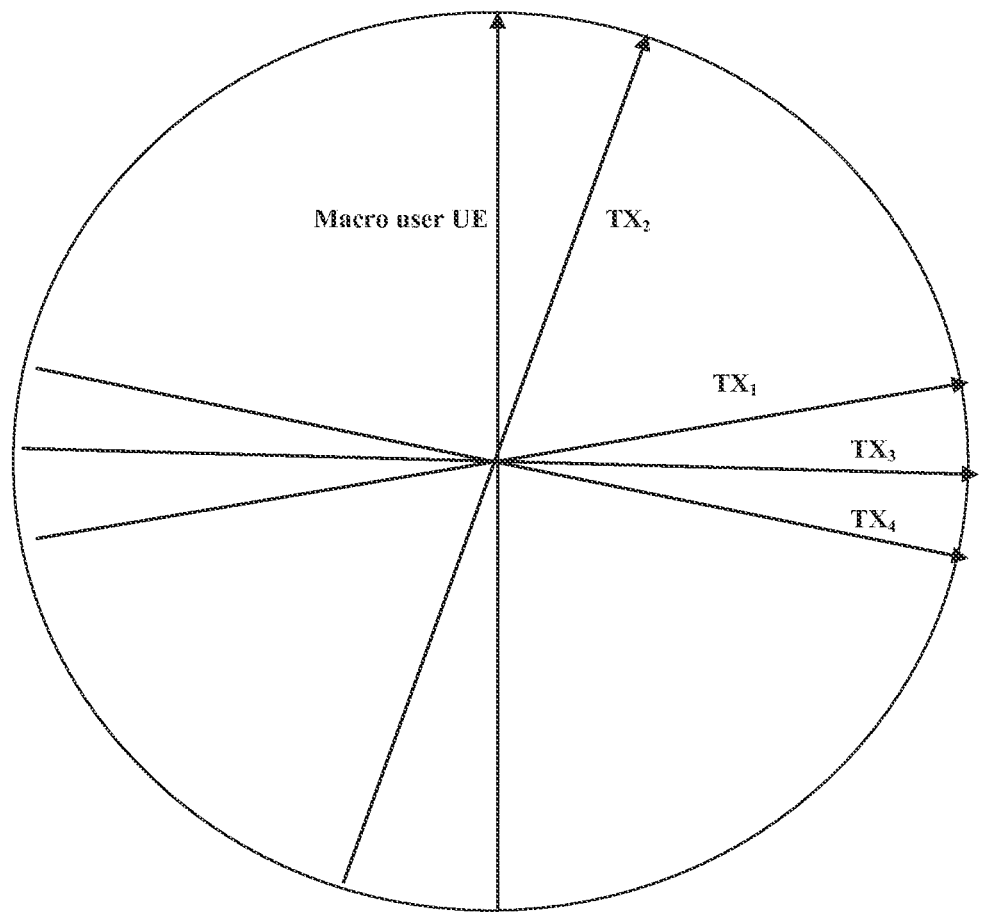
FIG. 3 represents an example of D2D transmitter and macro user channel directions with respect the base station.

An example scenario for D2D admission control in order to cluster D2D users for transmitting simultaneously with macro-user(s) using common time-frequency resources is as follows. Referring to FIG. 2, consider the case where four pairs of D2D devices, $TX_i$-$RX_i$ for i=1 to 4, want to communicate via D2D links, and the BS 40 also wants to serve the uplink UE or macro user M1. For ease of illustration, it is assumed that the BS has two antennas so that there is only a two-dimensional spatial signal space. FIG. 3 shows an example of how the channel directions from D2D transmitters to the BS and the channel direction from the macro user to the BS might be represented in two dimensional spatial signal space for the D2D transmitter $TX_i$ for i=1 to 4 and for the macro user or UE. In this example, the channel directions of transmitters $TX_1$, $TX_3$, and $TX_4$ are nearly orthogonal to the UE's channel direction, while the channel direction of transmitter $TX_2$ is nearly the same as the UE's. Thus, for example, the admission control algorithm, implemented as either centralized or distributed admission control, would allow the cluster of D2D pairs made up of $TX_1$-$RX_1$, $TX_3$-$RX_3$, and $TX_4$-$RX_4$ to continue their D2D sessions but would exclude the $TX_2$-$RX_2$ pair.

Figure 4:
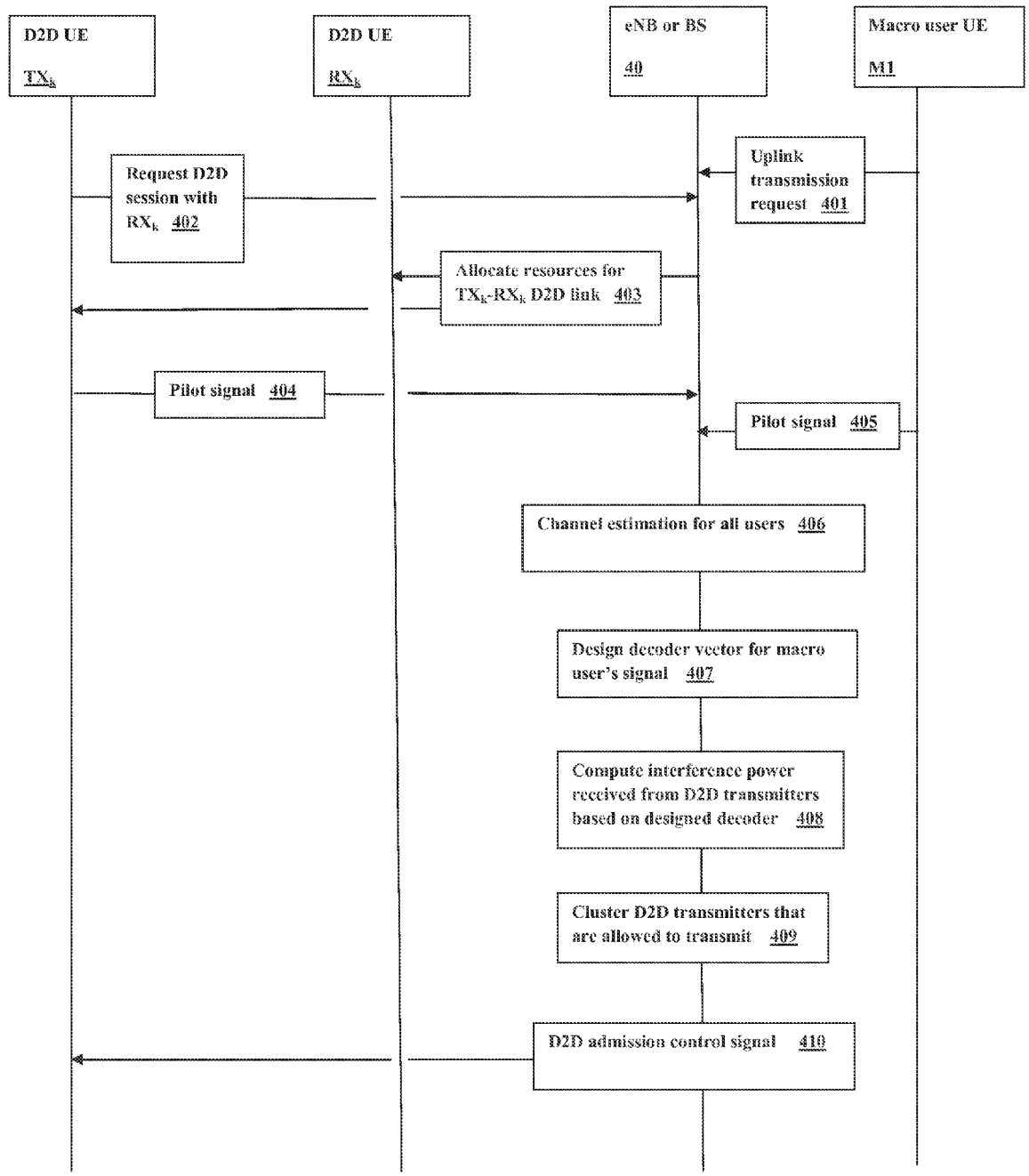
FIG. 4 illustrates an example algorithm for performing centralized admission control for D2D links to reduce interference.

FIG. 4 illustrates an example of a centralized D2D admission control algorithm. At stage 401, the macro user M1 sends an uplink transmission request to the BS, while the D2D transmitter $TX_k$ requests the BS for a D2D session with D2D receiver $RX_k$ (for k=1 to Z and Z is the number of D2D pairs) at stage 402. The D2D transmitters $TX_k$ and the macro user M1 send pilot signals to the BS at stages 404 and 405, respectively. The BS then estimates channel directions of all users at stage 406. After knowing the channel directions, the BS generates a decoder for the macro user signal at stage 407. For example, the BS may select a maximal ratio combiner (MRC) as the decoder, which matches the channel direction of the macro user in order to obtain maximal diversity gain for the macro user signal. Thereafter, at stage 408, the BS computes the possible interference power coming from the D2D transmissions, assuming that the generated decoder is used. Based on these computations, the BS then clusters those D2D transmitters that are allowed to transmit along with their respective receivers at stage 409. Referring again to FIG. 3, for example, the BS would allow D2D transmissions for the D2D links between $TX_1$-$RX_1$, $TX_3$-$RX_3$, and $TX_4$-$RX_4$ and clusters those devices because their transmission channel directions to the BS are nearly orthogonal to the decoder direction, which implies that the interference power caused by those D2D transmitters will have negligible impact on the macro user. The BS sends the clustered transmitters a D2D admission control signal at stage 410.

Figure 5:
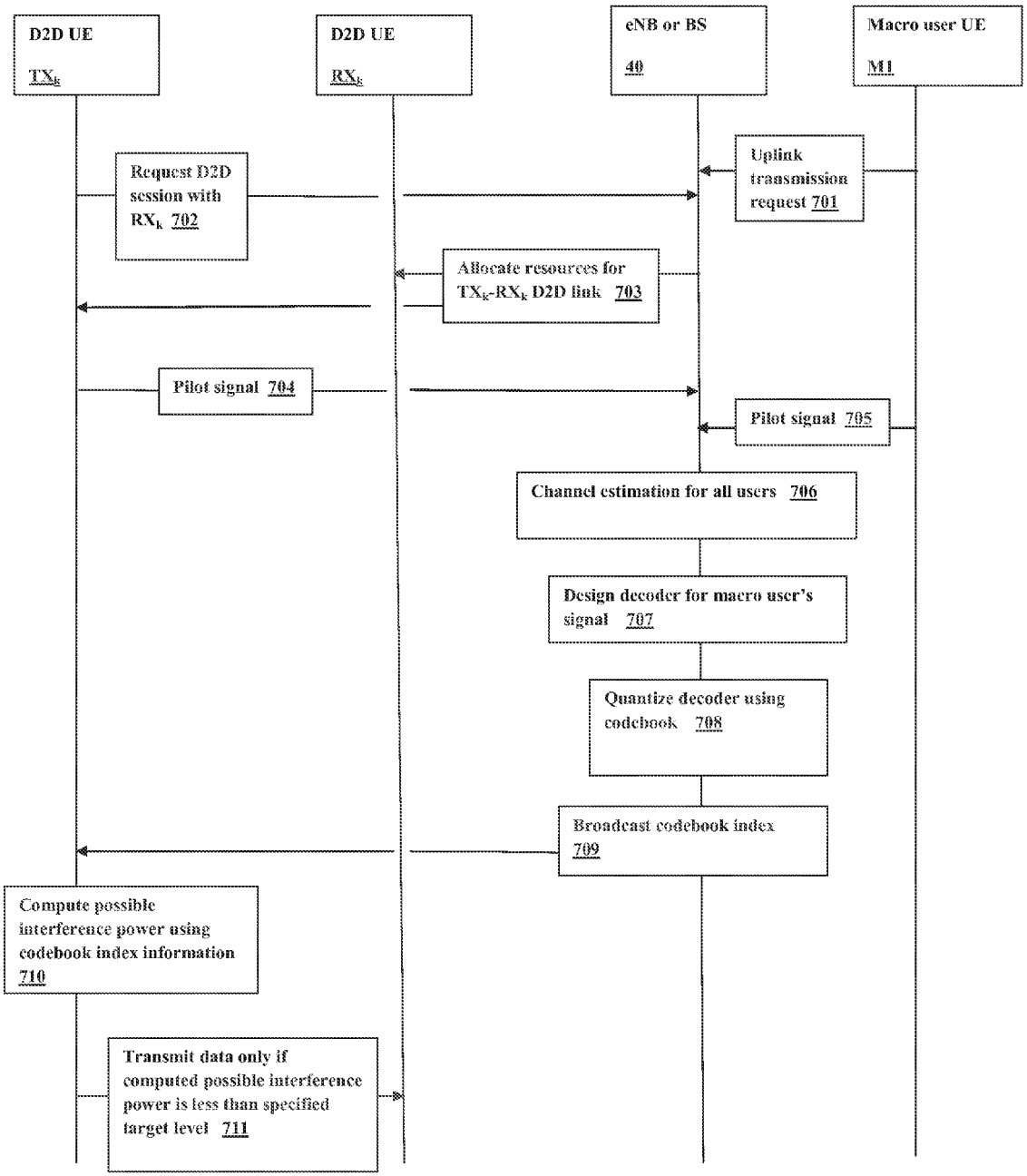
FIG. 5 illustrates an example algorithm for performing distributed admission control for D2D links to reduce interference.

FIG. 5 illustrates an example of a distributed D2D admission control algorithm. The first stages are the same as in the centralized admission control algorithm. At stage 701, the macro user M1 sends an uplink transmission request to the BS, while the D2D transmitter $TX_k$ requests the BS for a D2D session with D2D receiver $RX_k$ at stage 702. The D2D transmitters $TX_k$ and the macro user M1 send pilot signals to the BS at stages 704 and 705, respectively. The BS then estimates channel directions of all users at stage 706. After knowing the channel directions, the BS generates a decoder for the macro user signal at stage 707. At stage 708, the BS quantizes the decoder direction using a predefined codebook that is shared by D2D transmitters. At stage 709, the BS broadcasts the codebook index to all D2D transmitters. After obtaining the codebook index information, each D2D transmitter computes possible interference power caused to the BS at stage 710. For example, the D2D transmitter may estimate the interference by calculating the inner product between the channel direction from the D2D transmitter to the BS and the received codebook direction. If the possible interference exceeds a predefined target level, the D2D transmitter does not proceed with data transmission. Otherwise, it sends its data to the corresponding D2D receiver at stage 711.

The techniques described above may be applied to situations with particular numbers of uplink users and base station antennas as follows. If a BS with M antennas serves U uplink users and U<M, the BS may first choose a K-dimensional subspace for decoding the U uplink users. After this, the BS selects the D2D clusters so that the channel directions from D2D transmitters to the BS are nearly orthogonal to the K-dimensional decoder subspace. As long as M>U, the BS may select the D2D cluster that provides reduced interference to the BS. Also, the examples described above have been given in the context of reducing interference to a macro user's uplink transmissions where the D2D transmissions have been allocated uplink resources by the BS. The techniques may be easily extended, however, to situations where downlink resources are allocated for D2D transmission by symmetry. In that case, the macro user UE would compute the channel direction for transmissions to it from the BS and also channel directions for the pilot signals sent to it by the D2D transmitters using its multiple antennas. The macro user UE would then perform the same or similar methods as performed by the BS in the examples described above to control the admission of D2D transmitters based upon their potential for producing interference.

Base Station-Aided Interlink Interference Reduction

In this technique, base-station aided space-time interference alignment is used to mitigate interlink interference between D2D links that use the same resource for transmission. The BS actively helps to mitigate the interference between D2D links by overhearing the interference sent by the D2D transmitters and forwarding them to the D2D receivers. In particular, when the BS forwards the interference, it creates an interference pattern such that a D2D receiver sees the same interference pattern that it observes through channels between the D2D transmitters and receivers. This interference overhear-and-forward technique allows the D2D receivers to remove inter-D2D link interference when they decode the desired signal and thereby improves throughput of the overall D2D network. The technique enables long-range D2D communication in the cellular network because it is able to control interference regardless of D2D connection patterns (i.e., regardless of path-loss or position of devices in the cell). Furthermore, the technique serves multiple D2D communications within one-hop even if D2D pairs are not close, which reduces the number of transmissions relative to multi-hop communications which may be needed when D2D pairs are far apart. The technique may also increase spatial reuse in a heterogeneous cellular network where small cell BSs such as femto/pico BSs are able to help to mitigate interference of D2D communication by performing the technique in the particular spatial region where they deployed.

The technique will be explained with reference to the situation illustrated in FIG. 2 where four pairs of D2D devices, $TX_i$-$RX_i$ for i=1 to 4, each communicate via a D2D link. D2D transmitters $TX_1$ through $TX_4$ will be referred to as transmitters 1 through 4, respectively, and receivers $RX_1$ through $RX_4$ will be referred to as receivers 1 through 4, respectively. For purposes of illustration, it is assumed that the BS has two antennas so that there is a two-dimensional spatial signal space. It is also assumed that transmitters 1 and 2 belong to a cluster 1 and assume that transmitters 3 and 4 belong to a cluster 2, where the resources used by each cluster are orthogonal in time but the same resources are used in each cluster. To support long-range communication, if each D2D transmitter uses high transmit power to connect with the corresponding receiver, interference significantly degrades the throughput of D2D links. However, because of this high transmission power, the infrastructure BS has an opportunity to overhear the signals sent by D2D transmitters and can exploit this overheard interference to mitigate interference between the D2D links by forwarding a useful signal pattern to the D2D receivers. The technique will be described as being made up of three phases: a first transmission phase in which the D2D clusters transmit, a second transmission phase in which the BS transmits, and a decoding phase.

The first transmission phase involves cluster transmissions in two time slots, a first time slot and a subsequent second time slot. (A time slot may refer to an LTE slot as described above or may refer to any similar type of transmission interval.) In the first time slot, transmitter 1 and transmitter 2 (cluster 1) send an independent symbol $x_1[1]=s_1$ and $x_2[1]=s_2$ intended for receiver 1 and receiver 2, respectively. Neglecting the noise at the receivers, receiver 1 and receiver 2 each obtain a superposition, $L_1[1]=h_{1,1}[1]s_1+h_{1,2}[1]s_2$ and $L_2[1]=h_{2,1}[1]s_1+h_{2,2}[1]s_2$, respectively, where $h_{i,j}$ denotes the channel value from transmitter j to receiver i. Due to broadcast nature of wireless medium, all other receivers, i.e., receiver 3 and receiver 4 are also able to overhear the transmission and observe $L_3[1]=h_{3,1}[1]s_1+h_{3,2}[1]s_2$ and $L_4[1]=h_{4,1}[1]s_1+h_{4,2}[1]s_2$. In contrast with the receivers, the BS may decode two data symbols $s_1$ and $s_2$ by using its multiple antennas (assumed to be two in this example) if sufficient spatial diversity exists. The BS uses its two antennas to obtain the two data symbols by applying a spatial decoder (e.g., a zero-forcing (ZF), minimum mean squared error (MMSE), or maximum likelihood detection (MLD) decoder). Similarly, in the second time slot, transmitter 3 and transmitter 4 (cluster 2) send $x_3[2]=s_3$ and $x_4[2]=s_4$ for receiver 3 and receiver 4, respectively. During this time slot, receiver 3 and receiver 4 obtain equations $L_3[2]=h_{3,3}[2]s_3+h_{3,4}[2]s_4$ and $L_4[2]=h_{4,3}[2]s_3+h_{4,4}[2]s_4$, respectively, while receiver 1 and receiver 2 overhear equations containing interference symbols, $L_1[2]=h_{1,3}[2]s_3+h_{1,4}[2]s_4$ and $L_2[2]=h_{2,3}[2]s_3+h_{2,4}[2]s_4$, respectively. Again, the BS decodes the two data symbols sent by transmitter 3 and 4, $s_3$ and $s_4$, using a spatial decoder.

The second transmission phase uses only a third time slot that follows the first and second time slots. In this phase, it is assumed that the BS has knowledge of the current channel (i.e., channel state information or CSI) from the BS to each receiver, i.e., $g_{i,B}[3]$ for i={1, 2, 3, 4} where $g_{i,B}$ represents the channel transfer function from the BS to receiver i. Further, outdated but partial CSI between D2D links of different clusters, i.e., $\{h_{1,3}[2], h_{1,4}[2]\}$, $\{h_{2,3}[2], h_{2,4}[2]\}$, $\{h_{3,1}[1], h_{3,2}[1]\}$, and $\{h_{4,1}[1], h_{4,2}[1]\}$ is also known to the BS, due to feedback from those devices. Using this information, the BS transmits the four decoded data symbols $s_1$, $s_2$, $s_3$, and $s_4$ by using beamforming vectors as:

$$x_B[3]=\Sigma_{i=1}^{4} v_i s_i$$

where $v_i$ denotes the beamforming vector used for carrying symbol $s_i$ at the BS. The principle behind beamforming vector design is to provide the same interference signal pattern to all receivers which they observed in the first phase so that each receiver can use the currently received signal as side information. For example, receiver 2 received the interference signals $L_2[2]=h_{2,3}[2]s_3+h_{2,4}[2]s_4$ at the second time slot. Therefore, to deliver the same interference pattern for the undesired data symbols to receiver 2, the BS picks the beamforming vectors carrying symbols, $s_3$ and $s_4$ as:

$$[h_{2,3}[2] h_{2,4}[2]]=g_{2,B}^*[3][v_3 v_4]$$

Similarly, to make receiver 1 see the same linear combination of the undesired symbols, i.e., $L_1[2]=h_{1,3}[2]s_3+h_{1,4}[2]s_4$, which is the previously overheard equation during the first phase, the BS constructs the beamforming vectors to ensure the following space-time inter-user interference alignment conditions are given by:

$$[h_{1,3}[2] h_{1,4}[2]]=g_{1,B}^*[3][v_3 v_4]$$

Since it is assumed that the channel coefficients are drawn from a continuous distribution, which guarantees the matrix inversion almost surely, it is possible to construct four BS transmit beamforming vectors as:

$$[v_3 \ v_4] = \begin{bmatrix} g_{1,B}^*[3] \\ g_{2,B}^*[3] \end{bmatrix}^{-1} \begin{bmatrix} h_{1,3}[2] & h_{1,4}[2] \\ h_{2,3}[2] & h_{2,4}[2] \end{bmatrix}$$

Using the same principle, $v_1$ and $v_2$ can be designed as:

$$[v_1 \ v_2] = \begin{bmatrix} g_{3,B}^*[3] \\ g_{4,B}^*[3] \end{bmatrix}^{-1} \begin{bmatrix} h_{3,1}[1] & h_{3,2}[1] \\ h_{4,1}[1] & h_{4,2}[1] \end{bmatrix}$$

Therefore, the received signals at the users 'k' in cluster 1 (k=1,2) and users 'l' in cluster 2 (l=3,4) are given by:

$$y_k[3] = g_{k,B}^*[3]\left(\sum_{i=1}^{4} v_j s_i\right) + z_k[3]$$

$$= (g_{k,B}^*[3]v_1)s_1 + (g_{k,B}^*[3]v_2)s_2 +$$
$$(g_{k,B}^*[3]v_3)s_3 + (g_{k,B}^*[3]v_4)s_4 + z_k[3]$$
$$= h'_{k,1}[3]s_1 + h'_{k,2}[3]s_2 + h_{k,3}[2]s_3 + h_{k,4}[2]s_4 + z_k[3], k\{1, 2\}$$

and $$y_l[3] = g_{l,B}^*[3]\left(\sum_{i=1}^{4} v_j s_i\right) + z_l[3]$$
$$= (g_{l,B}^*[3]v_1)s_1 + (g_{l,B}^*[3]v_2)s_2 +$$
$$(g_{l,B}^*[3]v_3)s_3 + (g_{l,B}^*[3]v_4)s_4 + z_l[3]$$
$$= h'_{l,3}[3]s_3 + h'_{l,4}[3]s_4 + h_{l,1}[1]s_1 + h_{l,2}[1]s_2 + z_l[3], l\{1, 2\}$$

where $L_k[2]=h_{k,3}[2]s_3+h_{k,4}[2]s_4$ and $L_l[1]=h_{l,1}[1]s_1+h_{l,2}[1]s_2$ and where $[h'_{k,1}[3]h'_{k,2}[3]]=g_{k,B}^*[3][v_1\ v_2]$ and $[h'_{l,3}[3]h'_{l,4}[3]]=g_{l,B}^*[3][v_3\ v_4]$ denote the effective channels after using the beamforming vectors at time slot 3.

The decoding phase will now be described. The decoding procedure may be performed at each of the D2D receivers. Since receiver 1 already obtained knowledge of the interference signal $L_1[2]$ at the second time slot during the first transmission phase, it may eliminate the interference signal, $L_1[2]$ from $y_1[3]$. After removing the interference signals, the effective channel input-output relationship at receiver 1 during the three time slots is given by:

$$\begin{bmatrix} y_1[1] \\ y_1[3] - y_1[2] \end{bmatrix} = \begin{bmatrix} h_{1,1}[1] & h_{1,2}[1] \\ h'_{1,1}[3] & h'_{1,2}[3] \end{bmatrix}\begin{bmatrix} s_1 \\ s_1 \end{bmatrix} + \begin{bmatrix} z_1[1] \\ z_1[3] - z_1[2] \end{bmatrix}$$

where $$H'_1 = \begin{bmatrix} h_{1,1}[1] & h_{1,2}[1] \\ h'_{1,1}[3] & h'_{1,2}[3] \end{bmatrix}$$

Note that rank of effective channel matrix $H'_1$ becomes two because the elements of the effective channel vector received at the time slot 3, $[h'_{1,1}[3]h'_{1,2}[3]]$ are also statistically independent random variables due to the fact that the beamforming vectors, $v_1$ and $v_2$, were constructed by using the channel vectors $g_{3,B}^*[3]$ and $g_{4,B}^*[3]$, which are statistically independent with the direct channel $g_{1,B}^*[3]$. As a result, receiver 1 may decode the transmitted symbol $s_1$ by using a spatial decoder (e.g., a zero-forcing (ZF), minimum mean squared error (MMSE), or maximum likelihood detection (MLD) decoder) that eliminates interfering symbol $s_2$. The channel gains between receiver 1 and the other D2D devices needed for spatial decoding may be obtained by overhearing reference signals transmitted by those devices. By symmetry, all other receivers are capable of decoding the desired symbol $s_2$, $s_3$, and $s_4$ by applying the same decoding method. Since a total of four data symbols are delivered in three channel uses, a 33% gain in degrees of freedom (capacity) is obtained.

Figure 6:
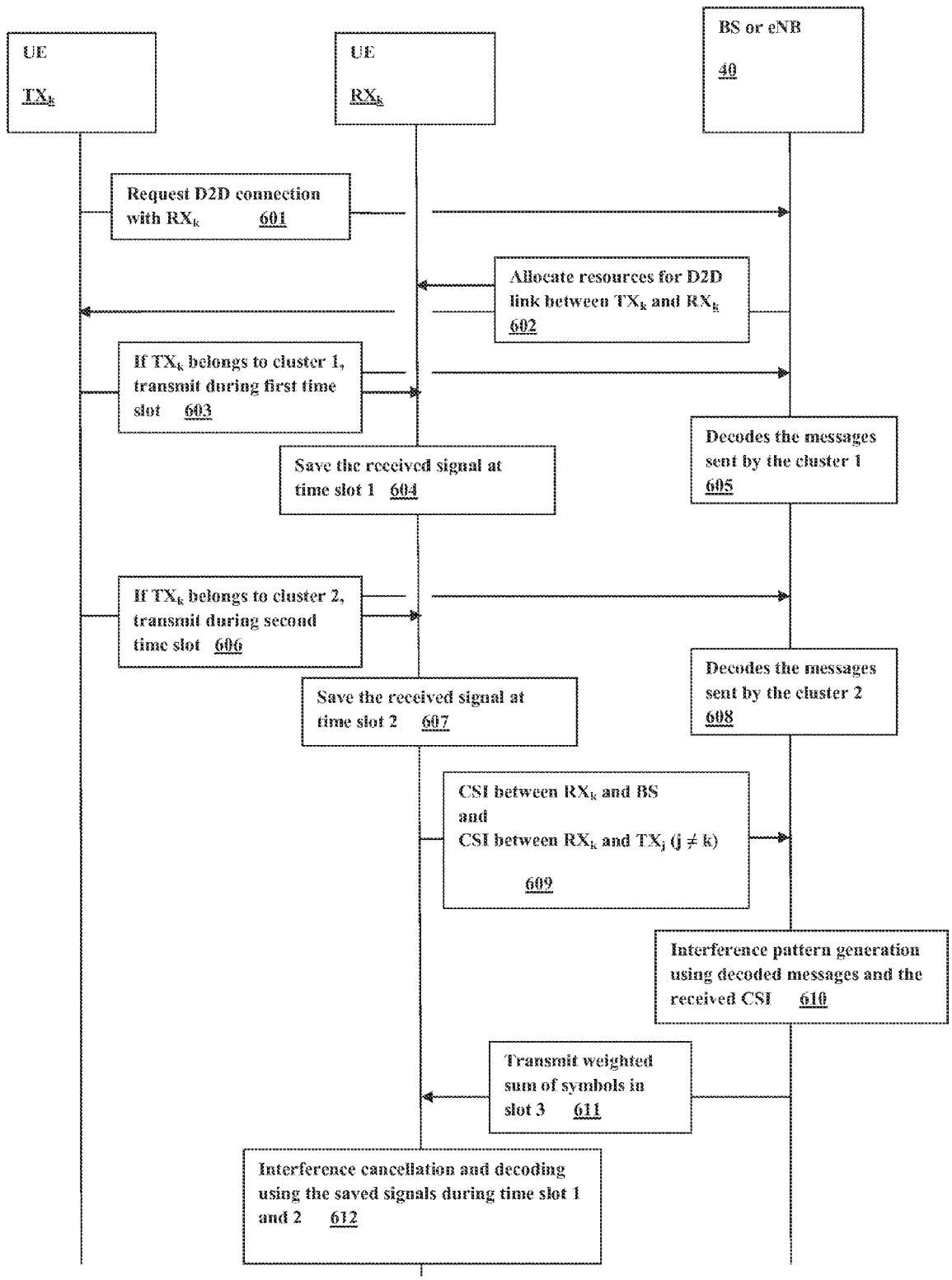
FIG. 6 illustrates an example algorithm for performing base-station aided space-time interference alignment to reduce interference.

FIG. 6 illustrates an example algorithm for performing the technique as described above. At stage 601, transmitter $TX_k$ requests the BS for a D2D session with receiver $RX_k$, resources for which are then allocated by the BS at stage 602. If $TX_k$ belongs to cluster 1, it transmits during the first time slot at stage 603. At stage 604, receiver $RX_k$ saves the signal transmitted during the first time slot. At stage 605, the BS decodes the signal received during the first time slot and extracts the symbols transmitted by each transmitter of cluster 1. If $TX_k$ belongs to cluster 2, it transmits during the second time slot at stage 606. At stage 607, receiver $RX_k$ saves the signal transmitted during the second time slot. At stage 608, the BS decodes the messages in the signal received during the second time slot and extracts the symbols transmitted by each transmitter of cluster 2. At stage 609, the receivers $RX_k$ transmit to the BS CSI between $RX_k$ and the BS and transmit CSI between $RX_k$ and $TX_j$ (j≠k) to the BS. At stage 610, the BS generates an interference pattern using the decoded messages and the received CSI, which pattern is transmitted to the receivers at stage 611. The receivers then use that interference pattern and the saved signals during first and second time slots to perform interference cancellation and decoding.

Figure 7:
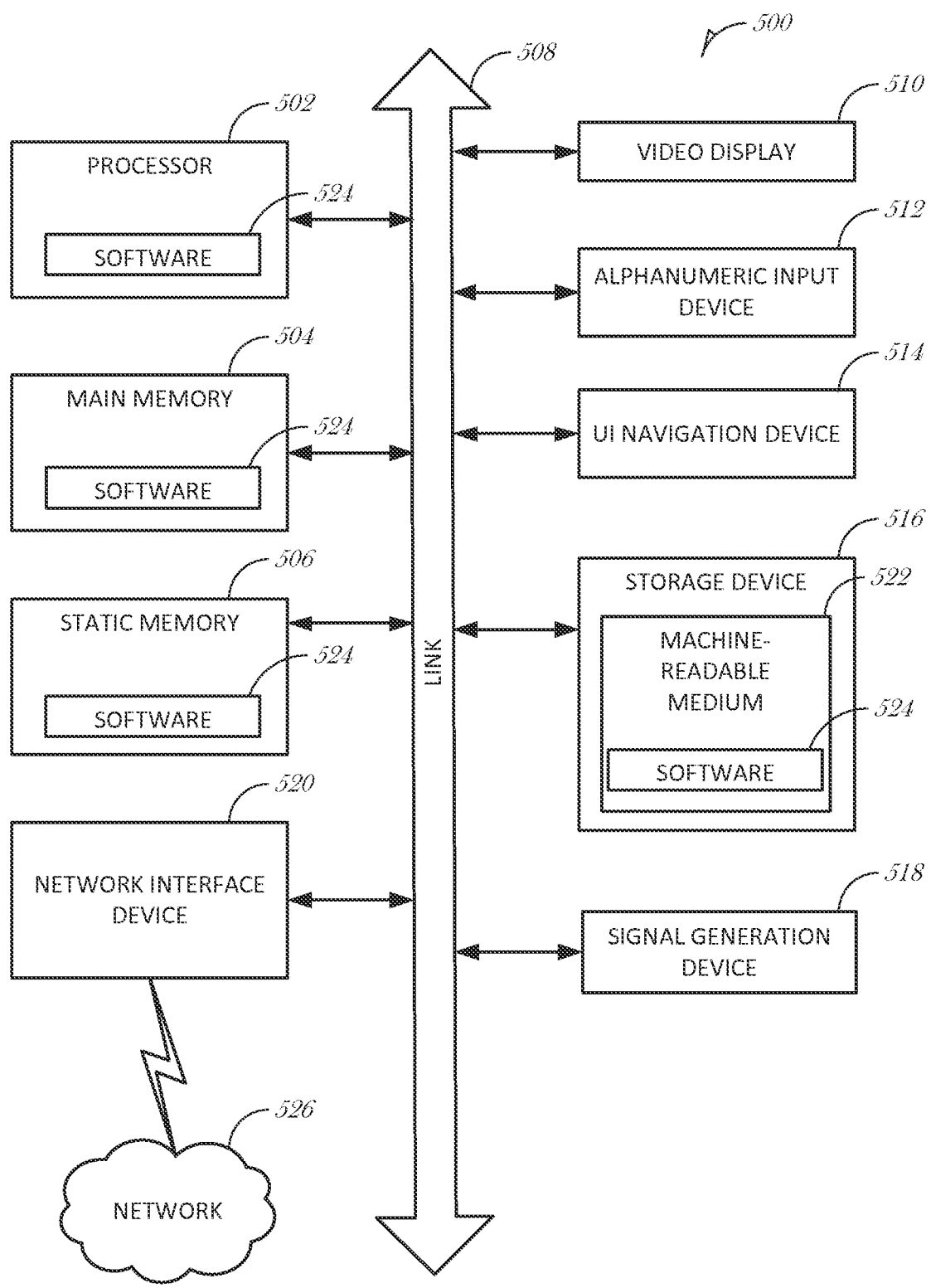
FIG. 7 is a block diagram illustrating an example machine upon which any one or more of the techniques (e.g., methodologies) discussed herein may perform, according to an example embodiment.

FIG. 7 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 522 is illustrated as a single medium, the term "machine readable medium" may include a single medium or multiple media (e.g., a centralized or distributed database, and/or associated caches and servers) that arranged to store the one or more instructions 524.

The term "machine readable medium" may include any medium that is capable of storing, encoding, or carrying instructions for execution by the machine 800 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example Embodiments

In Example 1, a method for operating an eNB comprises: generating a spatial decoder for receiving uplink transmissions from a first user equipment (UE) based upon transmissions from the first UE; receiving an uplink transmission from a second UE requesting device-to-device (D2D) time-frequency resources for transmitting in to another UE over a D2D link; and, employing the generated spatial decoder to compute a measure of the interference that would occur between uplink transmissions of the first UE and D2D transmissions of the second UE if common time-frequency resources were to be used.

In Example 2, the subject matter of Example 1 may optionally include generating the spatial decoder based upon reference signals transmitted by the first UE.

In Example 3, the subject matter of any of Examples 1-2 may optionally include generating the spatial decoder as a maximal ratio combining decoder.

In Example 4, the subject matter of any of Examples 1-3 may optionally include computing the measure of interference by determining the extent to which a spatial channel direction of the second UE's transmissions and a spatial channel direction specified by the generated spatial decoder are orthogonal.

In Example 5, the subject matter of any of Examples 1-4 may optionally include computing the spatial channel direction of the second UE's transmissions by generating a maximal ratio combining spatial decoder for the second UE and deriving a spatial channel direction therefrom.

In Example 6, the subject matter of any of Examples 1-5 may optionally include generating the maximal ratio combining spatial decoder for the second UE from reference signals transmitted by the second UE.

In Example 7, the subject matter of any of Examples 1-6 may optionally include computing the measure of interference by receiving the transmissions of the second UE using the generated spatial decoder and measuring the resulting signal power.

In Example 8, the subject matter of any of Examples 1-7 may optionally include denying the second UE's request for D2D time-frequency resources if the computed measure of interference exceeds a specified threshold.

In Example 9, the subject matter of any of Examples 1-8 may optionally include allocating D2D time-frequency resources to the second UE that are orthogonal to time-frequency resources used by the first UE for uplink transmissions if the computed measure of interference exceeds a specified threshold.

In Example 10, the subject matter of any of Examples 1-9 may optionally include quantizing the generated spatial decoder according to a codebook index and transmitting the codebook index to the second UE.

In Example 11, the subject matter of any of Examples 1-10 may optionally include transmitting to the second UE a channel direction between the eNB and the second UE for comparing with the codebook direction derived from the codebook index.

In Example 12, the subject matter of any of Examples 1-11 may optionally include wherein the channel direction between the eNB and the second UE is transmitted to the second UE as a codebook index.

In Example 13, an eNB comprises a radio transceiver and processing circuitry to perform any of the subject matters of Examples 1-12.

In Example 14, a method for operating a UE comprises: receiving allocations of D2D time-frequency resources for transmitting in a D2D communications mode from an evolved Node B (eNB); receiving a codebook index that specifies a spatial decoder from the eNB, wherein the codebook index may correspond to a spatial decoder generated by the eNB for receiving signals from a cellular UE; and, comparing a spatial channel direction derived from the specified spatial decoder and a channel direction between the UE and the eNB to derive a measure of the interference that would occur at the eNB between D2D transmissions by the UE and uplink transmissions by the cellular UE.

In Example 15, the subject matter of Example 14 may optionally include deriving the measure of interference by computing an inner product between the spatial channel direction derived from the specified spatial decoder and the spatial channel direction from the UE to the eNB.

In Example 16, the subject matter of any of Examples 14-15 may optionally include not proceeding with D2D communications if the derived measure of interference exceeds a specified value.

In Example 17, the subject matter of any of Examples 14-16 may optionally include requesting time-frequency resources that are orthogonal to time-frequency resources used for cellular uplink transmissions if the derived measure of interference exceeds a specified value.

In Example 18, the subject matter of any of Examples 14-17 may optionally include adjusting a power level used for D2D transmissions if the derived measure of interference exceeds a specified value.

In Example 19, the subject matter of any of Examples 14-18 may optionally include deriving the channel direction between the UE and the eNB from a spatial decoder specified by a codebook index transmitted by the eNB.

In Example 20, a UE device, comprises: a radio-frequency transceiver for providing an air interface for LTE (Long Term Evolution) and D2D (device-to-device) communications; and processing circuitry connected to the radio-frequency transceiver to perform any of the subject matters of Examples 14-19.

In Example 21, a method for operating an eNB serving a cell in an LTE network, comprises: receiving transmissions from D2D (device-to-device) transmitters belonging to a first set of D2D transmitter/receiver pairs using common time-frequency resources in a first time slot and employing multiple antennas to spatially decode symbols transmitted by each D2D transmitter; receiving transmissions from D2D transmitters belonging to a second set of D2D transmitter/receiver pairs using common time-frequency resources in a second time slot and employing multiple antennas to spatially decode symbols transmitted by each D2D transmitter; and, transmitting to D2D receivers belonging to the first and second sets a weighted sum of the decoded symbols in a third time slot, wherein the weighting of the weighted sum is such that that the D2D receivers of the first set are able to extract the symbols transmitted during the first time slot and such that that the D2D receivers of the second set are able to extract the symbols transmitted during the second time slot. The method may optionally include allocating time-frequency resources to user equipment (UE) in the cell for use in device-to-device (D2D) communications such that: a resource element in a first time slot is shared in a first cluster by a first D2D transmitter $TX_1$ transmitting a symbol $s_1$ to a first D2D receiver $RX_1$ and by a second D2D transmitter $TX_2$ transmitting a symbol $s_2$ to a second D2D receiver $RX_2$ and such that a resource element in a second time slot is shared in a second cluster by a third D2D transmitter $TX_3$ transmitting a symbol $s_3$ to a third D2D receiver $RX_3$ and a fourth D2D transmitter $TX_4$ transmitting a symbol $s_4$ to a fourth D2D receiver $RX_4$; employing two or more antennas to receive transmissions in the first and second time slots and decode the $s_1$ through $s_4$ symbols contained therein; and, transmitting a weighted sum of the $s_1$ through $s_4$ symbols using a resource element in a third time slot, wherein the weightings are such that the first and second D2D receivers each receive a superposition of the signal received in the second time slot and a combination of the $s_1$ and $s_2$ symbols weighted independently from their weighting as received in the first time slot and such that the third and fourth D2D receivers each receive a superposition of the signal received in the first time slot and a combination of the $s_3$ and $s_4$ symbols weighted independently from their weighting as received in the second time slot.

In Example 22, the subject matter of Example 21 may optionally include wherein the weighted sum of the $s_1$ through $s_4$ symbols transmitted in the third slot, $x_B[3]$ is computed as:

$$x_B[3]=\Sigma_{i=1}^{4} v_i s_i$$

where the $v_i$ are beamforming vectors for transmitting the symbols $S_1$ through $S_4$ with the two or more antennas that are computed such that:

$$g_{1,B}^*[3](v_3 s_3+v_4 s_4)=h_{1,3}[2]s_3+h_{1,4}[2]s_4$$

$$g_{2,B}^*[3](v_3 s_3+v_4 s_4)=h_{2,3}[2]s_3+h_{2,4}[2]s_4$$

$$g_{3,B}^*[3](v_1 s_1+v_2 s_2)=h_{3,1}[1]s_1+h_{3,2}[1]s_2$$

$$g_{4,B}^*[3](v_1 s_1+v_2 s_2)=h_{4,1}[1]s_1+h_{4,2}[1]s_2$$

where $g_{m,B}^*[3]$ is the complex conjugate of the channel transfer functions from the base station to the D2D receiver $RX_m$, in the third time slot and where $h_{m,n}[p]$ represents the channel transfer function from D2D transmitter $TX_n$ to D2D receiver $RX_m$ for m={1, 2, 3, 4}, n={1, 2, 3, 4}, and p={1,2}.

In Example 23, the subject matter of any of Examples 21-22 may optionally include wherein the beamforming vectors $v_i$ are computed as:

$$[v_1 \ v_2] = \begin{bmatrix} g_{3,B}^*[3] \\ g_{4,B}^*[3] \end{bmatrix}^{-1} \begin{bmatrix} h_{3,1}[1] & h_{3,2}[1] \\ h_{4,1}[1] & h_{4,2}[1] \end{bmatrix}$$

and $$[v_3 \ v_4] = \begin{bmatrix} g_{1,B}^*[3] \\ g_{2,B}^*[3] \end{bmatrix}^{-1} \begin{bmatrix} h_{1,3}[2] & h_{1,4}[2] \\ h_{2,3}[2] & h_{2,4}[2] \end{bmatrix}$$

In Example 24, the subject matter of any of Examples 21-23 may optionally include receiving channel state information (CSI) from each of the first through fourth D2D receivers for deriving the values of $h_{m,n}[p]$ for m={1, 2, 3, 4}, n={1, 2, 3, 4}, p={1,2}.

In Example 25, an eNB comprises a radio transceiver and processing circuitry to perform any of the subject matters of Examples 21-24.

In Example 26, a method for operating a UE comprises: receiving allocations of time-frequency resources for D2D communications from the eNB; receiving a transmitted symbol from a first D2D transmitter during a first time slot along with interfering transmissions from a second D2D transmitter using common time-frequency resources; receiving interfering transmissions from third and fourth D2D transmitters in a second time slot; receiving transmissions in a third time slot from the eNB that are a weighted sum of symbols transmitted by the first, second, third, and fourth D2D transmitters during the first and second time slots; and, using the transmissions received during the first, second, and third time slots to extract the symbol transmitted by the first D2D transmitter in the first time slot. The method may optionally include receiving in a resource element in a first time slot a symbol $s_1$ transmitted to the device by a first D2D transmitter $TX_1$ superposed with a symbol $s_2$ transmitted by second D2D transmitter $TX_2$ to a second D2D receiver $RX_2$; overhearing transmissions in a resource element in a second time slot that is shared by a third D2D transmitter $TX_3$ transmitting a symbol $s_3$ to a third D2D receiver $RX_3$ and a fourth D2D transmitter $TX_4$ transmitting a symbol $s_4$ to a fourth D2D receiver $RX_4$; receiving a signal from the eNB in a resource element in a third time slot that is a superposition of the signal received in the second time slot and a combination of the $s_1$ and $s_2$ symbols weighted independently from their weighting as received in the first time slot; and subtracting the signal received in the second slot from the signal received in the third slot and using the resulting signal along with the signal received in the first slot to extract the symbol $s_1$.

In Example 27, the subject matter of Examples 26 may optionally include extracting the symbol $s_1$ using the channel gain between the UE and the eNB and the channel gains between the UE and the first, second, third, and fourth D2D transmitters.

In Example 28, the subject matter of any of Examples 26-27 may optionally include obtaining the channel gains between the UE and the first, second, third, and fourth D2D transmitters by overhearing reference signals therefrom.

In Example 29, the subject matter of any of Examples 26-28 may optionally include extracting the symbol $s_1$ using a zero-forcing decoder, a minimum mean squared error decoder, and/or a maximum likelihood detection decoder.

In Example 30, a UE device, comprises: a radio-frequency transceiver for providing an air interface for LTE (Long Term Evolution) and D2D (device-to-device) communications; and processing circuitry connected to the radio-frequency transceiver to perform any of the subject matters of Examples 26-29.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LTE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for operating an evolved Node B (eNB) in an LTE (Long Term Evolution) network, comprising:
    generating a spatial decoder for receiving uplink transmissions from a first user equipment (UE) based upon transmissions from the first UE;
    receiving an uplink transmission from a second UE requesting device-to-device (D2D) time-frequency resources for transmitting to another UE over a D2D link; and,
    employing the generated spatial decoder to compute a measure of the interference that would occur between uplink transmissions of the first UE and D2D transmissions of the second UE if common time-frequency resources were to be used by determining the extent to which a spatial channel direction of the second UE's transmissions and a spatial channel direction specified by the generated spatial decoder are orthogonal.

2. The method of claim 1 further comprising generating the spatial decoder based upon reference signals transmitted by the first UE.

3. The method of claim 1 further comprising generating the spatial decoder as a maximal ratio combining decoder.

4. The method of claim 1 further comprising computing the spatial channel direction of the second UE's transmissions by generating a maximal ratio combining spatial decoder for the second UE and deriving a spatial channel direction therefrom.

5. The method of claim 4 further comprising generating the maximal ratio combining spatial decoder for the second UE from reference signals transmitted by the second UE.

6. The method of claim 1 further comprising computing the measure of interference by receiving transmissions from the second UE using the generated spatial decoder and measuring the resulting signal power.

7. The method of claim 1 further comprising denying the second UE's request for D2D time-frequency resources if the computed measure of interference exceeds a specified threshold.

8. The method of claim 1 further comprising allocating D2D time-frequency resources to the second UE that are orthogonal to time-frequency resources used by the first UE for uplink transmissions if the computed measure of interference exceeds a specified threshold.

9. The method of claim 1 further comprising quantizing the generated spatial decoder according to a codebook index and transmitting the codebook index to the second UE.

10. A user equipment (UE) device, comprising:
    a radio-frequency transceiver to provide an air interface for LTE (Long Term Evolution) and D2D (device-to-device) communications; and processing circuitry connected to the radio-frequency transceiver to:
receive allocations of D2D time-frequency resources for transmitting in a D2D communications mode from an evolved Node B (eNB);
receive a codebook index that specifies a spatial decoder from the eNB, wherein the codebook index corresponds to a spatial decoder generated by the eNB for receiving signals from a cellular UE;
compare a spatial channel direction derived from the specified spatial decoder and a channel direction between the UE and the eNB to derive a measure of the interference that would occur at the eNB between D2D transmissions by the UE and uplink transmissions by the cellular UE.

11. The device of claim 10 wherein the processing circuitry is to derive the measure of interference by computing an inner product between the spatial channel direction derived from the specified spatial decoder and the spatial channel direction from the UE to the eNB.

12. The device of claim 10 wherein the processing circuitry is further to not proceed with D2D communications if the derived measure of interference exceeds a specified value.

13. The device of claim 10 wherein the processing circuitry is further to request time-frequency resources that are orthogonal to time-frequency resources used for cellular uplink transmissions if the derived measure of interference exceeds a specified value.

14. The device of claim 10 wherein the processing circuitry is further to adjust a power level used for D2D transmissions if the derived measure of interference exceeds a specified value.

15. The device of claim 10 wherein the processing circuitry is to derive the channel direction between the UE and the eNB from a spatial decoder specified by a codebook index transmitted by the eNB.

16. A method for operating an evolved Node B (eNB) serving a cell in an LTE (Long Term Evolution) network, comprising:
receiving transmissions from D2D (device-to-device) transmitters belonging to a first set of D2D transmitter/receiver pairs using common time-frequency resources in a first time slot and employing multiple antennas to spatially decode symbols transmitted by each D2D transmitter;
receiving transmissions from D2D transmitters belonging to a second set of D2D transmitter/receiver pairs using common time-frequency resources in a second time slot and employing multiple antennas to spatially decode symbols transmitted by each D2D transmitter; and,
transmitting to D2D receivers belonging to the first and second sets a weighted sum of the decoded symbols in a third time slot, wherein the weighting of the weighted sum is such that that the D2D receivers of the first set are able to extract the symbols transmitted during the first time slot and such that that the D2D receivers of the second set are able to extract the symbols transmitted during the second time slot.

17. The method of claim 16 further comprising:
allocating time-frequency resources such that: a resource element in a first time slot is shared in a first cluster by a first D2D transmitter $TX_1$ transmitting a symbol $s_1$ to a first D2D receiver $RX_1$ and by a second D2D transmitter $TX_2$ transmitting a symbol $s_2$ to a second D2D receiver $RX_2$ and such that a resource element in a second time slot is shared in a second cluster by a third D2D transmitter $TX_3$ transmitting a symbol $s_3$ to a third D2D receiver $RX_3$ and a fourth D2D transmitter $TX_4$ transmitting a symbol $s_4$ to a fourth D2D receiver $RX_4$;
employing two or more antennas to receive transmissions in the first and second time slots and decode the $s_1$ through $s_4$ symbols contained therein; and,
transmitting a weighted sum of the $s_1$ through $s_4$ symbols using a resource element in a third time slot, wherein the weightings are such that the first and second D2D receivers each receive a superposition of the signal received in the second time slot and a combination of the $s_1$ and $s_2$ symbols weighted independently from their weighting as received in the first time slot and such that the third and fourth D2D receivers each receive a superposition of the signal received in the first time slot and a combination of the $s_3$ and $s_4$ symbols weighted independently from their weighting as received in the second time slot.

18. The method of claim 17 wherein the weighted sum of the $s_1$ through $s_4$ symbols transmitted in the third slot, $x_B[3]$ is computed as:

$$x_B[3]=\Sigma_{i=1}^{4} v_i s_i$$

where the $v_i$ are beamforming vectors for transmitting the symbols $S_1$ through $S_4$ with the two or more antennas that are computed such that:

$$g_{1,B}^*[3](v_3 s_3 + v_4 s_4) = h_{1,3}[2]s_3 + h_{1,4}[2]s_4$$

$$g_{2,B}^*[3](v_3 s_3 + v_4 s_4) = h_{2,3}[2]s_3 + h_{2,4}[2]s_4$$

$$g_{3,B}^*[3](v_1 s_1 + v_2 s_2) = h_{3,1}[1]s_1 + h_{3,2}[1]s_2$$

$$g_{4,B}^*[3](v_1 s_1 + v_2 s_2) = h_{4,1}[1]s_1 + h_{4,2}[1]s_2$$

where $g_{m,B}^*[3]$ is the complex conjugate of the channel transfer functions from the base station to the D2D receiver $RX_m$ in the third time slot and where $h_{m,n}[p]$ represents the channel transfer function from D2D transmitter $TX_n$ to D2D receiver $RX_m$ for m={1,2,3,4}, n={1,2,3,4}, and p={1,2}.

19. The method of claim 18 wherein the beamforming vectors $v_i$ are computed as:

$$[v_1 \quad v_2] = \begin{bmatrix} g_{3,B}^*[3] \\ g_{4,B}^*[3] \end{bmatrix}^{-1} \begin{bmatrix} h_{3,1}[1] & h_{3,2}[1] \\ h_{4,1}[1] & h_{4,2}[1] \end{bmatrix}$$

and $$[v_3 \quad v_4] = \begin{bmatrix} g_{1,B}^*[3] \\ g_{2,B}^*[3] \end{bmatrix}^{-1} \begin{bmatrix} h_{1,3}[2] & h_{1,4}[2] \\ h_{2,3}[2] & h_{2,4}[2] \end{bmatrix}.$$

20. The method of claim 19 further comprising receiving channel state information (CSI) from each of the first through fourth D2D receivers for deriving the values of $h_{m,n}[p]$ for m={1,2,3,4}, n={1,2,3,4}, p={1,2}.

21. A user equipment (UE) device, comprising:
a radio transceiver to provide an air interface for communicating with an evolved node B (eNB) and for device-to-device (D2D) communications; and
processing circuitry to:
receive a transmitted symbol from a first D2D transmitter during a first time slot along with interfering transmissions from a second D2D transmitter using common time-frequency resources;
receive interfering transmissions from third and fourth D2D transmitters in a second time slot;
receive transmissions in a third time slot from the eNB that are a weighted sum of symbols transmitted by the first, second, third, and fourth D2D transmitters during the first and second time slots;

use the transmissions received during the first, second, and third time slots to extract the symbol transmitted by the first D2D transmitter in the first time slot.

22. The device of claim 21 wherein the processing circuitry is to receive in a resource element in a first time slot a symbol $s_1$ transmitted to the device by a first D2D transmitter $TX_1$ superposed with a symbol $s_2$ transmitted by second D2D transmitter $TX_2$ to a second D2D receiver $RX_2$;

receive transmissions in a resource element in a second time slot that is shared by a third D2D transmitter $TX_3$ transmitting a symbol $s_3$ to a third D2D receiver $RX_3$ and a fourth D2D transmitter $TX_4$ transmitting a symbol $s_4$ to a fourth D2D receiver $RX_4$;

receive a signal from the eNB in a resource element in a third time slot that is a superposition of the signal received in the second time slot and a combination of the $s_1$ and $s_2$ symbols weighted independently from their weighting as received in the first time slot;

subtract the signal received in the second slot from the signal received in the third slot and use the resulting signal along with the signal received in the first slot to extract the symbol $s_1$.

23. The device of claim 22 wherein the processing circuitry is to extract the symbol $s_1$ using the channel gain between the UE and the eNB and the channel gains between the UE and the first, second, third, and fourth D2D transmitters.

24. The device of claim 23 wherein the processing circuitry is to obtain the channel gains between the UE and the first, second, third, and fourth D2D transmitters by receiving reference signals therefrom.

\* \* \* \* \*